United States Patent [19]

Hayashi et al.

[11] Patent Number: 4,916,172
[45] Date of Patent: Apr. 10, 1990

[54] REACTION CURABLE COMPOSITION AND ARTIFICIAL MARBLE

[75] Inventors: Takao Hayashi, Zushi; Kazuhiko Kameda, Yokohama, both of Japan

[73] Assignee: Asahi Glass Company, Ltd., Tokyo, Japan

[21] Appl. No.: 248,086

[22] Filed: Sep. 23, 1988

[30] Foreign Application Priority Data

Sep. 25, 1987 [JP] Japan .............................. 62-238981
May 13, 1988 [JP] Japan .............................. 63-114862

[51] Int. Cl.$^4$ .......................... C08K 3/36; C08K 3/34; C08K 3/26; C08K 3/22
[52] U.S. Cl. ................................ 523/171; 523/500; 523/506; 523/514; 523/521
[58] Field of Search ............... 523/171, 500, 506, 514, 523/521; 525/37, 39, 48

[56] References Cited

U.S. PATENT DOCUMENTS 4,139,578 2/1979 Baughman et al. .................. 525/39
4,829,103 5/1989 Oda et al. ............................ 523/171

FOREIGN PATENT DOCUMENTS 58-189215 11/1983 Japan .................................. 523/171

*Primary Examiner*—Lewis T. Jacobs
*Attorney, Agent, or Firm*—Oblon, Spivak, McClelland, Maier & Neustadt

[57] ABSTRACT

A reaction curable composition comprising a curable component, a polymerization initiator for curing the curable component and from 30 to 90% by weight, based on the total composition, of inorganic fillers, wherein the curable component is a combination of a polyfunctional allylcarbonate monomer or its precondensate, an unsaturated polyester and a reactive diluent, or a combination of a partially cured product of at least two of such three components and the rest of such three components, if any.

10 Claims, No Drawings

REACTION CURABLE COMPOSITION AND ARTIFICIAL MARBLE

The present invention relates to a reaction curable composition and an artificial marble obtained by molding and curing the composition. More particularly, the present invention relates to a reaction curable composition for the production of an artificial marble having high mechanical strength and excellent weather resistance and stain resistance and having an excellent processability, and an artificial marble obtained by molding and curing such a composition.

Heretofore, an artificial marble prepared by molding and curing a resin composition is practically employed for various applications including sanitary wares such as toilet tables, bath tubs or kitchen counters, and building interior or exterior materials. To obtain such an artificial marble in the form of a molded resin product, it is common to employ a casting method wherein a composition prepared by blending and mixing e.g. inorganic fillers or fibrous reinforcing material to a resin as matrix constituting the artificial marble is filled in a mold, followed by curing. Otherwise, a compression molding method is employed by using SMC (sheet-molding compound) which is prepared by blending inorganic fillers, a thickener and other additives to a resin, impregnating the blend to e.g. glass fibers and enclosing the impregnated glass fibers with a film to form a sheet, or BMC (bulk-molding compound) which is prepared in the same manner but in a bulk form.

The matrix resin used in such molding methods, is usually an unsaturated polyester resin. However, an artificial marble made of such a resin is more or less inferior in its appearance. For example, an artificial marble prepared by using an unsaturated polyester resin as matrix, has little transparency and thus has a drawback that an appearance due to transparency specific to marble can not be obtained. It has been proposed to overcome such a drawback (Japanese Unexamined Patent Publications No. 66462/1984 and No. 101552/1986).

On the other hand, reflecting an increasing demand for high quality, the artificial marble is required to have an appearance which gives a gorgeous impression with the internal patterns of the molded product to be seen through due to the transparency, to have mechanical strength such as flexural strength and impact strength and to have improved surface hardness or the heat resistant properties. Accordingly, an attention has been drawn to a methacrylate resin having good transparency and mechanical strength as such a matrix resin.

A number of proposals have been made with respect to an artificial marble or a composition for an artificial marble wherein a methacrylate resin is used as matrix. As basic proposals, a product obtained by curing a mixture of a methyl methacrylate polymer with an alumina hydrate (Japanese Examined Patent Publication No. 22586/1975, U.S. Pat. No. 3,847,865) and a granite product composed of opaque or translucent particles of predetermined particle sizes wherein a methyl methacrylate polymer and alumina trihydrate particles are used as matrix (Japanese Unexamined Patent Publication No. 72707/1977, U.S. Pat. No. 4,085,246), are known. Further, as proposals having a feature in the combination with a filler, it has been proposed, for example, to incorporate aluminum hydroxide (Japanese Examined Patent Publication Nos. 22586/1975 and 43222/1980), to incorporate a combination of aluminum hydroxide with either one of magnesium hydroxide, magnesium carbonate and aluminum oxide (Japanese Unexamined Patent Publication No. 104621/1978), to incorporate silica (Japanese Unexamined Patent Publication No. 4611/1981), and to incorporate calcium silicate (Japanese Unexamined Patent Publication No. 33308/1984). Further, a methacrylate resin composition containing a filler and having its fluidity during the molding improved, is also disclosed (Japanese Unexamined Patent publication No. 245609/1985).

As described in the foregoing, the matrix resin is being changed from an unsaturated polyester resin to a methacrylate resin.

Further, an artificial stone molded product has also been proposed which is composed of a polymer of a composition comprising as matrix a polyfunctional allylcarbonate resin, preferably diethylene glycol bis(allylcarbonate) polymer, known as a resin having excellent transparency as well as high strength and abrasion resistance and fine powder of silica or alumina hydrate (Japanese Unexamined Patent Publication No. 111953/1986).

As described in the foregoing, the matrix resin for an artificial marble is desired to be a resin having excellent transparency so that the molded artificial marble will have an appearance which gives a gorgeous impression, and for this purpose, a methacrylate resin is generally regarded as a suitable resin. However, there is a problem that the methacrylate resin and a filler are usually substantially different in various properties, and the resin and the filler have poor affinity or adhesion particularly due to the difference in their interfacial properties. Further, when the filler is incorporated, the viscosity increases by the incorporation, whereby it becomes extremely difficult to uniformly disperse the filler. Accordingly, there is a problem that it is difficult to improve the properties of the artificial marble or to reduce the cost by increasing the amount of the filler.

Consequently, the artificial marble thereby obtained has a drawback that the mechanical strength such as the flexural strength or impact strength is practically inadequate. In order to overcome such drawback, it has been proposed that the filler is subjected to surface treatment, for example, with a silane coupling agent, and such a surface-treated filler is incorporated to a resin. However, no adequate effect has yet been obtained. Besides, an increase of the manufacturing cost is thereby unavoidable. Furthermore, no adequate stain resistance or chemical resistance will be obtained by such a means for improvement.

Similar problems exist in the case where a polyfunctional allylcarbonate having excellent transparency is used as the matrix resin. Namely, diethylene glycol bis(allylcarbonate) has poor affinity and adhesion to an inorganic filler. Accordingly, the inorganic filler is not adequately dispersed in the matrix resin, whereby it is extremely difficult to incorporate a substantial amount of the filler. Even when the filler is incorporated in a small amount, it is likely that the filler is non-uniformly present in the molded product as an artificial marble, whereby a gorgeous appearance is hardly obtainable. Besides, the mechanical strength tends to be low. For example, when being cut or drilled for processing, the molded product is likely to undergo breakage to form a defective product.

With a composition containing diethylene glycol bis(allylcarbonate) as the matrix resin, it is necessary to heat it to gradually raise the temperature to obtain a molded product, whereby an extremely long time is required.

In view of the above problems, the present inventors have conducted various studies and researches to obtain an artificial marble having excellent properties by incorporating inorganic fillers to a copolymer in which various polymerizable monomers capable of providing a transparent resin are used in combination, so that the drawback of a conventional artificial marble composed solely of a single resin matrix is complemented and the properties are improved as the synergistic effect.

Accordingly, it is an object of the present invention to provide a reaction curable composition useful for the preparation of an artificial marble in which inorganic fillers are uniformly dispersed in a resin matrix and have an improved adhesion and which has thus excellent in the mechanical strength, the surface smoothness, the gloss, the stain resistance and the chemical resistance and has an appearance with a gorgeous impression and which has good processability, and to provide an artificial marble obtained by molding and curing such a composition.

The present invention provides a reaction curable composition comprising a curable component, a polymerization initiator for curing the curable component and from 30 to 90% by weight, based on the total composition, of inorganic fillers, wherein the curable component is a combination of a polyfunctional allylcarbonate monomer or its precondensate, an unsaturated polyester and a reactive diluent, or a combination of a partially cured product of at least two of such three components and the rest of such three components, if any.

Now, the present invention will be described in detail with reference to the preferred embodiments.

The polyfunctional allylcarbonate monomer in the present invention is a monomer having at least two allylcarbonate groups

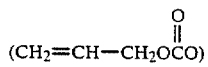

and a polyol residue. The polyol residue is derived from an aliphatic or alicyclic polyol having from 2 to 4 hydroxyl groups at least two hydroxyl groups. As such a polyol, ethylene glycol, diethylene glycol, triethylene glycol, dipropylene glycol, 1,4-butanediol, 1,6-hexanediol, glycerol or trimethylolpropane may be mentioned. A preferred polyol is an aliphatic diol, and particularly preferred is diethylene glycol. The most preferred polyfunctional allylcarbonate monomer is diethylene glycol bis(allylcarbonate) represented by the formula:

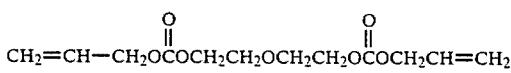

This monomer is polymerized in the presence of a polymerization initiator to form a cured product having excellent transparency and high mechanical strength and abrasion resistance. Thus, this is presently used as a main material for plastic lenses. Further, it is possible to use a prepolymer obtained by preliminary partial polymerization of this monomer. This prepolymer is preferably the one obtained by the polymerization reaction of the monomer in the presence of a polymerization initiator to have a polymerization degree of from 1 to 100 poise (25° C. as measured by B model viscometer). Further, it is possible to use a mixture of this monomer and the prepolymer.

The unsaturated polyester in the present invention is a compound called also as alkyd resin which has at least several unsaturated groups. Preferably it is a polyester oligomer having an unsaturated polybasic acid residue, a saturated polybasic acid residue and a saturated polyol residue. Such polybasic acid residue and saturated polyol residue are preferably divalent, but may contain a small amount of a tri- or higher divalent residue. As the unsaturated polybasic acid residue, a maleic acid residue or a fumaric acid residue is preferred. As the saturated polybasic acid residue, a residue of e.g. succinic acid, adipic acid, sebacic acid, orthophthalic acid, isophthalic acid or terephthalic acid is preferred. The polyol is preferably a diol such as ethylene glycol, diethylene glycol, propylene glycol, dipropylene glycol, 1,4-, 1,3- or 2,3-butanediol, neopentyl glycol or 1,6-hexanediol. Further, such a diol may be used in combination with a small amount of a tri- or higher valent polyol such as glycerol or trimethylol propane. By incorporating an unsaturated polyester to the above-mentioned polyfunctional allylcarbonate monomer or its precondensate, the curing rate of the polyfunctional allylcarbonate polymer or its precondensate can remarkably be accelerated.

The reactive diluent in the present invention is a monomer having a viscosity lower than the unsaturated polyester and containing at least one $\alpha,\beta$-unsaturated group. For example, it may be a liquid olefin such as monofunctional or polyfunctional methacrylate or acrylate, or styrene. Preferably, a monofunctional or polyfunctional methacrylate such as an alkyl methacrylate or a polymethacrylate of a polyol. Specifically, it includes methyl methacrylate, ethyl methacrylate and 2-ethylhexyl methacrylate. These diluents may be used alone or in combination. Among them, methyl methacrylate is most preferred, since it is readily available. Such a reactive diluent may be employed in the form of a preliminarily partially polymerized prepolymer, but is preferably used in the form of a monomer as a reactive diluent for controlling the viscosity of the reaction curable composition.

The proportions of the polyfunctional allylcarbonate monomer or its precondensate, the unsaturated polyester and the reactive diluent in the curable component of the present invention are such that the unsaturated polyester is from 10 to 490 parts by weight and the reactive diluent is from 10 to 490 parts by weight, relative to 100 parts by weight of the polyfunctional allylcarbonate monomer or its precondensate, and the total of the unsaturated polyester and the reactive diluent is from 300 to 500 parts by weight. If the proportions depart substantially from these ranges, the artificial marble obtained by molding and curing the reaction curable composition tends to be poor in the appearance and in the mechanical properties.

The polyfunctional allylcarbonate monomer and the reactive diluent constituting the curable component of the reaction curable composition may be preliminarily polymerized partially. In such a case, the proportions of the respective components are the same as specified above.

In the reaction curable composition of the present invention, the viscosity is increased by the incorporation of the inorganic filler to the curable component. If the viscosity is too high, the casting of the composition into a mold will be difficult, and defoaming tends to be incomplete, which is likely to bring about a defective appearance or a deterioration of the molding product. Therefore, it is important to adjust the viscosity to a proper level. For this purpose, the reactive diluent is used as an essential component, and the incorporation in a liquid state is particularly preferred. Further, it is preferred to incorporate at least one compound selected from the group consisting of organic phosphoric acid esters and silane coupling agents, as a part of the reactive diluent or as an additional component of the reaction curable composition.

By the incorporation of a small amount of a phosphoric acid ester of methacrylic acid represented by the formula:

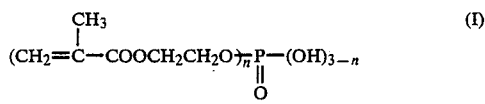

wherein n is an integer of 1 or 2, as the organic phosphoric acid ester, the mechanical properties and particularly the processability of the artificial marble obtained by molding and curing the reaction curable composition will be remarkably improved. This ester is used usually in an amount of from 0.1 to 5% by weight, preferably from 0.5 to 3% by weight. Even if the amount exceeds 5% by weight, no additional effect will be obtained. If the amount is less than 0.1% by weight, no adequate effect will be obtained. Even when this compound is not incorporated, the artificial marble will have practically adequate properties.

As the organic phosphoric acid ester, an alkyl phosphate of the formula:

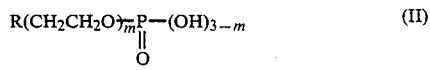

wherein R is an alkyl group having from 8 to 12 carbon atoms, and m is an integer of 1 or 2, may be used as a reactive diluent or as an additional component to adjust the viscosity of the reaction curable composition. This ester may be incorporated in an amount of from 0.1 to 5% by weight, preferably from 0.5 to 1% by weight, and by the combination with the compound of the above formula I, the properties of the artificial marble may further be improved.

Further, in order to improve the dispersibility of the organic filler or its adhesion with the resin, it is effective to incorporate, for example, a silane coupling agent or an inorganic filler treated with a silane coupling agent.

In order to mold and cure the reaction curable composition to obtain an artificial marble, the reaction curable composition contains a polymerization initiator. Specific examples of such a polymerization initiator include benzoyl peroxide (BPO), cumene hydroperoxide, t-butyl hydroperoxide, di-t-butyl peroxide, diisopropylperoxydicarbonate, di-n-propylperoxydicarbonate and di(2-ethylhexyl)peroxycarbonate. Particularly preferred is benzoyl peroxide or diisopropylperoxydicarbonate. Such a polymerization initiator is incorporated in an amount of from 0.5 to 10 parts by weight, preferably from 1 to 7 parts by weight, relative to 100 parts by weight of the curable component.

The reaction curable composition of the present invention contains an inorganic filler in addition to the above-mentioned curable component. Such an inorganic filler may be aluminum hydroxide, magnesium hydroxide, silica, calcium carbonate, calcium silicate, kaolin, clay or talc which is commonly used in the conventional artificial marble. Among such inorganic fillers, aluminum hydroxide is preferred, since the artificial marble thereby obtained will have excellent chemical resistance, particularly against acidic solutions. Such inorganic fillers are preferably in a particle form, and the particle size of the fillers is preferably at a level of an average particle size of from 0.6 to 50 μm. The smaller the particle size, the higher the whiteness of the artificial marble, but the light transmitting properties tend to decrease. Further, the smaller the particle size, the higher the viscosity with the same amount of incorporation, and the operation efficiency tends to be low. On the contrary, the larger the particle size, the lower the viscosity, and the amount of incorporation can be increased, but the dispersibility tends to be poor, and the precipitation of the fillers tends to take place, thus leading to a deterioration of the physical strength of the artificial marble. Therefore, the particle size is preferably within a range of from 3 to 10 μm. And the amount of incorporation is from 30 to 90% by weight, based on the entire curable component. If the amount is less than 30% by weight, it becomes difficult to obtain a color tone as an artificial marble, and if it exceeds 90% by weight, uniform dispersion tends to be difficult.

To the reaction curable composition of the present invention, it is of course possible to incorporate fibrous materials such as glass fibers or other additives for the purpose of improving the moldability or the properties of the artificial marble.

The polymerization may be conducted at a temperature of from 80° to 120° C. for from 2 to 4 hours. Preferably, the temperature is stepwise raised from a low temperature. The polymerization molding time can be made remarkably short as compared with the polymerization molding condition in the case where diethylene glycol bis(allylcarbonate) was used alone.

A conventional casting mold may be used as the mold to obtain the artifical marble. Further, other molds useful for continuous molding may be employed. There is no particular restriction as to the type of the mold.

Now, the present invention will be described in further detail with reference to Examples. However, it should be understood that the present invention is by no means restricted to such specific Examples.

EXAMPLES 1 to 3

Diethylene glycol bis(allylcarbonate) ("CR-39", manufactured by PPG Co.), an unsaturated polyester ("Upica 8639", tradename, manufactured by Japan Upica Co., Ltd.) and methyl methacrylate, as monomers, and aluminum hydroxide ("Hydilight H-320", average particle size: 3 μm, manufactured by Showa Denko K.K.) as an inorganic filler were blended in the proportions as identified in Table 1. Further, benzoyl peroxide was added as a polymerization initiator in the amount as identified in Table 1, and a silane coupling agent ("A-174", manufactured by Nippon Unica Co.) was added in an amount of 1% by weight relative to the inorganic filler. The mixture was uniformly mixed and defoamed to obtain a composition. The viscosities of this composition was measured. The results are shown in Table 1.

Then, this composition was cast in a mold assembled by reinforced glass sheets. After confirming that no remaining foams existed, the mold was put in an air oven at a temperature of 80° C., and it was then heated to a temperature of 100° C. over a period of 2 hours and further to 120° C. over a period of 1 hour and maintained at 120° C. for 30 minutes for polymerization molding.

The mold was taken out from the air oven, cooled and then disassembled to obtain an artificial marble of 50 cm × 50 cm × 12 mm in thickness as the molded product.

The following properties were measured with respect to the artificial marble thus obtained. The results are shown in Table 1. As the mechanical strength, the flexural strength and the flexural modulus were measured in accordance with JIS K-7203, the Izod impact strength (notched) was measured in accordance with JIS K-7110, the Barcole hardness (GYZ J934-1) was measured, and, the appearance of the surface was visually inspected.

COMPARATIVE EXAMPLES 1 to 3

Diethylene glycol bis(allylcarbonate) and aluminum hydroxide; diethylene glycol bis(allylcarbonate), an unsaturated polyester ("Upica 8639") and aluminum hydroxide; and diethylene glycol bis(allylcarbonate), methyl methacrylate and aluminum hydroxide, were mixed, respectively, in the proportions as identified in Table 1, and treated in the same manner as in Examples 1 to 3 to obtain paste compositions, which were further polymerized and cured for molding to obtain artificial marbles as molded products.

The properties of the artificial marbles thus obtained were measured. The results are shown in Table 1.

EXAMPLE 4

A polymerization initiator was added to diethylene glycol bis(allylcarbonate), and the mixture was heated at 80° C. for 2 hours to obtain a prepolymer. This prepolymer was mixed with other components in the proportions as identified in Table 1 to obtain a composition, which was put in an air oven in the same manner as in Examples 1 to 3, heated to 80° C. over a period of one hour and further to 120° C. over a period of one hour, and then maintained at 120° C. for 30 minutes for polymerization molding to obtain an artificial marble as a molded product.

The properties of the artificial marble thus obtained were measured. The results are shown in Table 1.

TABLE 1

| | | Example | | | | Comparative Example | | |
|---|---|---|---|---|---|---|---|---|
| | | 1 | 2 | 3 | 4 | 1 | 2 | 3 |
| Composition (parts by weight) | Diethylene glycol bis(allylcarbonate) | 140 | 210 | 100 | 100 | 350 | 210 | 210 |
| | Unsaturated polyester | 140 | 70 | 200 | 50 | — | 140 | — |
| | Methyl methacrylate | 70 | 70 | 50 | 200 | — | — | 140 |
| | Aluminum hydroxide | 650 | 650 | 650 | 650 | 650 | 650 | 650 |
| | Silane coupling agent | 6.5 | 6.5 | 6.5 | 6.5 | 6.5 | 6.5 | 6.5 |
| | Benzoyl peroxide | 10.5 | 10.5 | 10.5 | 10.5 | 10.5 | 10.5 | 10.5 |
| | Viscosity (CPS.25° C.) | 5500 | 3800 | 12000 | 1800 | 2300 | 10000 | 2200 |

| | | | Example | | | | Comparative Example | | |
|---|---|---|---|---|---|---|---|---|---|
| | | | 1 | 2 | 3 | 4 | 1 | 2 | 3 |
| Properties | Mechanical properties | Flexural strength (kgf/mm²) | 5.3 | 4.3 | 4.2 | 3.8 | 2.0 | 3.5 | 2.7 |
| | | Flexural modulus (kgf/mm²) | 780 | 500 | 450 | 480 | 320 | 480 | 400 |
| | | Izod impact strength (kgf/mm²) (notched) | 1.7 | 1.5 | 1.4 | 1.4 | 1.1 | 1.4 | 1.2 |
| | | Barcole hardness | 61 | 52 | 50 | 47 | 22 | 45 | 30 |
| | | Appearance | Good | Good | Good | Good | *1 | *2 | *3 |

Notes:
*1: Surface susceptible to scratching. Inadequate curing.
*2: Numerous foams remain.
*3: Non-uniform dispersion of aluminum hydroxide. Inadequate curing.

EXAMPLES 5 to 7

Paste compositions were prepared in the same manner as in Examples 1, 2 and 4 except that phosphoric acid ester of 2-hydroxyethyl metacrylate ("JPA 514", manufactured by Johoku Kagaku Kogyo K.K.) was used instead of the silane coupling agent, an alkyl phosphate ("Gafac RS-710", tradename, manufactured by Toho Kagaku K.K.) was used as a viscosity-reducing agent, and other additives as identified in Table 2 were used.

Then, by using these paste compositions, artificial marbles were prepared by the polymerization molding in the same manner as in Examples 1, 2 and 4.

The properties of the artificial marbles thus obtained are shown in Table 2. As additional properties, the processability was examined by drilling and cutting, whereby the production of defective products was ascertained. The results are shown in Table 2.

TABLE 2

| | | Example | | |
|---|---|---|---|---|
| | | 5 | 6 | 7 |
| Composition (parts by weight) | Diethylene glycol bis(allylcarbonate) | 140 | 210 | 100 |
| | Unsaturated polyester | 140 | 70 | 50 |
| | Methyl methacrylate | 70 | 70 | 200 |
| | Aluminum hydroxide | 650 | 650 | 650 |
| | Phosphoric acid ester of 2-hydroxyethyl methacrylate | 6.5 | 6.5 | 6.5 |
| | Alkyl phosphate | 3.2 | 3.2 | 3.2 |
| | Benzoyl peroxide | 10.5 | 10.5 | 10.5 |
| | Tinuvin P (ultraviolet absorber) | 3.5 | 3.5 | 3.5 |
| | "Byk A-515" (defoaming agent)* | 5 | 5 | 5 |
| | Viscosity (CPS.25° C.) | 5000 | 1800 | 700 |

| | | Example |
|---|---|---|

TABLE 2-continued

| Properties | | | 5 | 6 | 7 |
|---|---|---|---|---|---|
| | Mechanical properties | Flexural strength (kgf/mm$^2$) | 6.0 | 7.7 | 6.0 |
| | | Flexural modulus (kgf/mm$^2$) | 800 | 830 | 800 |
| | | Izod impact strength (kgf/mm$^2$) | | | |
| | | Notched | 1.5 | 1.8 | 1.3 |
| | | Not notched | 7.0 | 10.0 | 6.5 |
| | | Tensile strength (kg/mm$^2$) | 4.0 | 4.3 | 4.0 |
| | | Barcole hardness | 65 | 65 | 65 |
| | | Appearance | Good | Good | Good |
| | | Processability | Good | Good | Good |

*Manufactured by Byk Chemie Co.

EXAMPLE 8

With respect to the artificial marble obtained in Example 1, the stain resistance was measured in accordance with JIS K-6902. Further, with respect to the chemical resistance, the surface change was examined in accordance with JIS K-7114 by using 20% hydrochloric acid, 10% sulfuric acid, 10% sodium hydroxide, halogenated hydrocarbons, reagent acetone, benzene and toluene.

Further, the flame retardancy was measured in accordance with JIS A-1321.

The above results are shown in Table 3.

COMPARATIVE EXAMPLE 4

With respect to the artificial marble obtained in Comparative Example 2, the stain resistance and the chemical resistance were measured in the same manner as in Example 8. The results are shown in Table 3. (The tests on the products obtained in Comparative Examples 1 and 3 were omitted since the curing was inadequate with such products.)

TABLE 3

| | | Example 8 | Comparative Example 4 |
|---|---|---|---|
| Stain resistance | Tea | A | B |
| | Coffee | A | B |
| | Milk | A | B |
| | 1% Iodine alcohol solution | B | C |
| | Vinegar | A | B |
| | 10% Citric acid aqueous solution | A | B |
| | Gasoline | A | B |
| | Acetone (industrial grade) | A | B |
| | Olive oil | A | B |
| | 10% Ammonium | A | B |
| | Red crayon | A | C |
| | Black shoe paste | A | B |
| | Red pigment for food No. 102, 0.01% aqueous solution | A | B |
| | Blue black ink | B | C |
| | 2% Mercurochlorme aqueous solution | A | C |
| | 5% Carbolic acid aqueous solution | A | B |
| | Saturated acid sodium sulfite aqueous solution | A | B |
| | Soy source | A | C |
| Chemical resistance | 20% Hydrochloric acid | A | B |
| | 10% Sulfuric acid | A | B |
| | 10% Sodium hydroxide | A | B |
| | Chloroform | B | C |
| | Carbon tetrachloride | A | B |
| | 1,2-Dichloroethane | B | C |
| | 1,1,1-Trichloroethane | B | C |
| | Chlorobenzene | A | B |
| | Reagent acetone | A | B |
| | Reagent benzene | A | B |
| | Reagent toluene | A | B |
| | Reagent xylene | A | B |
| Flame retardancy | Temperature time surface area Td θ (°C. min) | 33*2 | — |
| | Fuming coefficient CA (—) | 10*3 | — |
| | Flame remaining time (sec) | 2*4 | — |

*Evaluation A: No change
B: Slight change
C: Strong change
*2Standard < 350
*3Standard < 120
*4Standard < 30

The artificial marble obtained by molding and curing the reaction curable composition of the present invention has features that the dispersion of the inorganic filler in the matrix resin is excellent and accordingly has a high level of whiteness, a light transmittance and an appearance similar to natural marble. As compared with conventional artificial marbles, it is excellent not only in the mechanical strength but also in the stain resistance, chemical resistance and processability, and thus suitable for use in a wide range of applications. Further, the polymerization of the reaction curable composition of the present invention to prepare an artificial marble can be remarkably shortened as compared with e.g. the polymerization of a composition containing diethylene glycol bis(allylcarbonate) as the sole curable component.

We claim:

1. A reaction curable composition comprising a curable component, a polymerization initiator for curing the curable component and an amount of from 30 to 90% by weight, based on the total composition, to effect the appearance of marble upon curing, of an inorganic filler selected from the group consisting of aluminum hydroxide, magnesium hydroxide, silica, calcium carbonate, calcium silicate, kaolin, clay or talc, wherein the curable component is a combination of a polyfunctional allylcarbonate or its precondensate, an unsaturated polyester and a reactive diluent, or a combination of a partially cured product of at least two of such three components and the uncured remainder thereof if there be any.

2. The reaction curable composition according to claim 1, wherein the curable component is a combination comprising 100 parts by weight of the polyfunctional allylcarbonate monomer or its precondensate, from 10 to 490 parts by weight of the unsaturated polyester and from 10 to 490 parts by weight of the reactive diluent, and the total of the unsaturated polyester and the reactive diluent is from 30 to 500 parts by weight, or a combination comprising a partially cured product of such three components in the above proportions.

3. The reaction curable composition according to claim 1, wherein the polyfunctional allylcarbonate monomer is diethylene glycol bis(allylcarbonate).

4. The reaction curable composition according to claim 1, wherein the reactive diluent is a monofunctional or polyfunctional methacrylate.

5. The reaction curable composition according to claim 1, wherein the inorganic filler is aluminum hydroxide.

6. The reaction curable composition according to claim 1, which contains from 0.1 to 5% by weight of at least one compound selected from the group consisting of organic phosphoric acid esters and silane coupling agents, as a part of the reactive diluent or as an additional component.

7. The reaction curable composition according to claim 6, wherein the organic phosphoric acid esters are phosphoric acid esters of methacrylic acid represented by the formula:

$$(CH_2=\overset{CH_3}{\underset{|}{C}}-COOCH_2CH_2O)_{\overline{n}}\overset{}{\underset{\overset{\|}{O}}{P}}-(OH)_{3-n} \qquad (I)$$

wherein n is an integer of 1 or 2.

8. An artificial marble obtained by molding and curing the reaction curable composition of claim 1.

9. An artificial marble obtained by molding and curing the reaction curable composition of claim 2.

10. An artificial marble obtained by molding and curing the reaction curable composition of claim 6.

* * * * *